United States Patent
Adamany et al.

(10) Patent No.: US 6,952,584 B2
(45) Date of Patent: *Oct. 4, 2005

(54) METHOD & SYSTEMS FOR PROVIDING INFORMATION TO A HOME SYSTEM REGARDING A WIRELESS UNIT ROAMING IN A VISITED SYSTEM

(75) Inventors: Robert Andrew Adamany, Alpharetta, GA (US); Richard L. Charbono, Jr., Snellville, GA (US); Edward Lawrence Didion, Dover, FL (US); Ann M. Catanese, Tarpon Springs, FL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 51 days.

This patent is subject to a terminal disclaimer.

(21) Appl. No.: 10/366,503

(22) Filed: Feb. 13, 2003

(65) Prior Publication Data

US 2003/0224789 A1 Dec. 4, 2003

Related U.S. Application Data

(63) Continuation of application No. 09/359,515, filed on Jul. 23, 1999, now Pat. No. 6,615,041.
(60) Provisional application No. 60/107,224, filed on Nov. 5, 1998.

(51) Int. Cl.$^7$ ................................................ H04Q 7/20
(52) U.S. Cl. .................... 455/435; 455/432.1; 455/433; 455/435.1
(58) Field of Search ............................. 455/432.1, 433, 455/435.1, 439, 445, 461, 466

(56) References Cited

U.S. PATENT DOCUMENTS 4,901,340 A    2/1990 Parker et al.

(Continued)

FOREIGN PATENT DOCUMENTS

EP    0788287    8/1997

(Continued)

OTHER PUBLICATIONS

US 5,282,240, 1/1994, Buhl et al. (withdrawn)

(Continued)

*Primary Examiner*—Simon Nguyen
(74) *Attorney, Agent, or Firm*—Cantor Colburn LLP

(57) ABSTRACT

Methods and systems to provide a home system with information about a wireless unit roaming in a visited system based on information the wireless unit provides to the visited system. A mobile switching center (MSC-V) of the visited system receives the information from the wireless unit and routes a message to an international gateway. In response, the international gateway creates a new message or alters the original message, and transmits the new or altered message to a mobile switching center (MSC-H) of the home system. In response to receipt of the new or altered message, the MSC-H validates the wireless unit (if valid), creates a response to the new or altered message, and routes the response to the international gateway. The response may include an authorization period for the wireless unit and/or OCOS/TCOS information. In response, the international gateway creates a new response or alters the response, and transmits the new or altered response to the MSC-V. In response to receipt of the new or altered response, the MSC-V registers the wireless unit, provides the wireless unit with communication services in the visited system, or otherwise follows instructions in the new or altered response. If the wireless unit moves to an area served by a second MSC-V, the second MSC-V checks with the international gateway about the wireless unit. If an authorization period is in effect, the international gateway may provide a validation of the wireless unit to the second MSC-V without another message to the home system of the wireless unit.

23 Claims, 5 Drawing Sheets

U.S. PATENT DOCUMENTS

| | | | |
|---|---|---|---|
| 5,142,654 A | | 8/1992 | Sonberg et al. |
| 5,282,250 A | | 1/1994 | Dent et al. |
| 5,475,735 A | | 12/1995 | Williams et al. |
| 5,497,412 A | | 3/1996 | Lannen et al. |
| 5,564,068 A | | 10/1996 | Nguyen |
| 5,610,974 A | | 3/1997 | Lantto |
| 5,699,408 A | | 12/1997 | Krolopp et al. |
| 5,712,900 A | | 1/1998 | Maupin et al. |
| 5,724,658 A | | 3/1998 | Hasan |
| 5,734,700 A | | 3/1998 | Hauser et al. |
| 5,819,178 A | | 10/1998 | Cropper |
| 5,854,982 A | * | 12/1998 | Chambers et al. ........... 455/445 |
| 5,862,481 A | * | 1/1999 | Kulkami et al. .......... 455/432.2 |
| 5,867,788 A | * | 2/1999 | Joensuu ...................... 455/445 |
| 5,884,179 A | | 3/1999 | Patel |
| 5,905,952 A | * | 5/1999 | Joensuu et al. ............. 455/433 |
| 5,915,220 A | | 6/1999 | Chelliah |
| 5,943,619 A | | 8/1999 | Coyne et al. |
| 5,978,678 A | * | 11/1999 | Houde et al. ............... 455/433 |
| 6,006,094 A | | 12/1999 | Lee |
| 6,011,975 A | | 1/2000 | Emery et al. |
| 6,026,298 A | | 2/2000 | Lamb et al. |
| 6,035,198 A | | 3/2000 | Wiehe |
| 6,039,624 A | | 3/2000 | Holmes |
| 6,047,179 A | | 4/2000 | Kirby |
| 6,094,578 A | | 7/2000 | Purcell et al. |
| 6,138,007 A | * | 10/2000 | Bharatia ................... 455/414.1 |
| H001921 H | | 11/2000 | Fletcher |
| 6,353,621 B1 | * | 3/2002 | Boland et al. .............. 370/467 |
| 6,453,174 B1 | * | 9/2002 | Cunningham et al. ...... 455/560 |
| 6,584,310 B1 | * | 6/2003 | Berenzweig ............. 455/432.1 |
| 6,615,041 B2 | * | 9/2003 | Adamany et al. ........ 455/432.1 |

FOREIGN PATENT DOCUMENTS

| | | |
|---|---|---|
| EP | 0 788 287 | 8/1997 |
| WO | WO 93/11646 | 6/1993 |
| WO | WO-93/11646 | 6/1993 |
| WO | WO-97/17816 | 5/1997 |
| WO | WO 97/17816 | 5/1997 |
| WO | WO-97/26769 | 7/1997 |
| WO | WO 97/26769 | 7/1997 |
| WO | WO-97/36447 | 10/1997 |
| WO | WO 97/36447 | 10/1997 |
| WO | WO-97/38544 | 10/1997 |
| WO | WO 97/38544 | 10/1997 |
| WO | WO 97/42786 | 11/1997 |
| WO | WO-97/42786 | 11/1997 |
| WO | WO 97/47146 | 12/1997 |
| WO | WO-97/47146 | 12/1997 |
| WO | WO 97/47151 | 12/1997 |
| WO | WO-97/47151 | 12/1997 |
| WO | WO 98/02011 | 1/1998 |
| WO | WO-98/02011 | 1/1998 |
| WO | WO 98/19489 | 5/1998 |
| WO | WO-98/19489 | 5/1998 |

OTHER PUBLICATIONS

Fraud Management, GTE website pages.

Yu, James I., "Overview of EIA/TIA IS–41," The Third IEEE Intern. Symp. on Personal, Indoor & Mobile Radio Communications, Oct. 19, 1992, pp. 220–224.

Rabe, M., Written Opinion for PCT/US99/17218, Aug. 2, 2000.

*Fraud Management*, GTE website pages.

Rabe, M., *Written Opinion for PCT/US99/17218*, Aug. 2, 2000.

* cited by examiner

METHOD & SYSTEMS FOR PROVIDING INFORMATION TO A HOME SYSTEM REGARDING A WIRELESS UNIT ROAMING IN A VISITED SYSTEM

RELATED APPLICATION

The present application claims priority to and the benefit of the prior filed copending and commonly owned provisional application entitled "SCP/International Gateway—An SS7 Network Element That Performs SS7 Message Routing, Call Delivery and PIN Fraud Protection for Cellular Users Roaming Internationally," filed in the United States Patent and Trademark Office on Nov. 5, 1998, assigned application Ser. No. 60/107,224, and incorporated herein by reference. The present application is a continuation of and claims priority to and the benefit of the prior filed copending and commonly owned application entitled "Method and Systems for Providing Information to a Home System Regarding a Wireless Unit Roaming in a Visited System," filed in the United States Patent and Trademark Office on Jul. 23, 1999, assigned application Ser. No. 09/359,515 now U.S. Pat. No. 6,615,041, and incorporated herein by reference.

TECHNICAL FIELD

This invention relates to telecommunications, and in particular, to the provision of information to a home wireless communications system with respect to a wireless unit that is roaming in a visited wireless communications system.

BACKGROUND OF THE INVENTION

A distinguishing feature of humans as a species is our ability to communicate with each other. Our methods of communication have become ever more sophisticated and have led to the development of wireless communications. Generally, wireless communications are communications that are transmitted through the use of radio frequency (RF) technology. Wireless communications include communications that are transmitted through the use of wireless units such as cellular telephones, mobile telephones, car phones, personal communication service (PCS) units, pagers, and the like, and also may include appropriately equipped computers, computer peripherals, and the like.

A wireless unit is particularly useful to a person on the move. For example, a person may use his or her wireless unit while driving a car. The wireless communications service to the person's wireless unit is provided typically by a service provider that may also be referred to herein as a carrier. Typically, a person who obtains wireless communications service from a service provider is generally referred to herein as a subscriber or a user. A subscriber may make or receive communications with his or her wireless unit. The term "communication" is used herein to refer to any call, message, announcement, or other exchange of data or information, whether analog or digital, that may be received on a wireless unit or transmitted from a wireless unit, and/or may be received or transmitted from a wireless unit that is operating as part of any other device such as a computer.

When a user initiates a communication on his or her wireless unit, a base station in or serving a predetermined geographic area wherein the subscriber is located receives the communication. The geographic area that is served with wireless communications service by the carrier is referred to herein as the service area of the service provider. The service provider typically operates a wireless communications network or system to provide wireless communications service to the geographic area. The wireless communications network or system includes the referenced base station, and other elements such as mobile switching centers (MSCs). The wireless communications network also includes elements that interface with the public switched telephone network (PSTN), and other networks and systems so as to provide for communications between and among parties using wireless units or using wireline units.

Upon receipt of a communication from a wireless unit of a user, the base station transmits the communication to a mobile switching center (MSC) (sometimes referred to as a mobile-service switching center or mobile telecommunications switching office (MTSO), or switch). In response to the receipt of the communication, the MSC further routes the communication as appropriate. This routing may take the communication to and through the PSTN, to and through the same wireless communications system, to and through another wireless communications system, or combinations thereof.

In addition to making a call, a subscriber may receive a communication on his or her wireless unit from a caller. The caller directs his or her communication to the number associated with the subscriber's wireless unit, which is referred to herein as the mobile number of the wireless unit. The mobile number may be the mobile identification number (MIN) of the wireless unit. The communication is routed through the PSTN, through other networks, and/or wireless communications systems until the communication reaches the MSC serving the subscriber's wireless unit. This MSC may be referred to as the serving MSC or the serving switch. The serving MSC then further routes the communication to the wireless unit.

As noted, a wireless unit is particularly useful when a subscriber is on the move such as when the subscriber is driving a car. The subscriber's mobility may take the subscriber out of the service area served by the service provider from whom the subscriber subscribes. In other words, the subscriber's mobility may take the subscriber out of his or her home service area served by his or her home service provider or home carrier. The subscriber may move so as to be located in another service area that is served by a different service provider with whom the subscriber has no direct business relationship. The subscriber is said to be "roaming" out of his or her home service area and may be referred to as a "roamer", or "roaming subscriber" in a visited service area that is served by a visited system. To provide a roaming subscriber with communications service, service providers have agreed to follow certain procedures in the processing of communications with respect to each other's subscribers. Generally, a roaming subscriber is validated and may be authenticated by the visited system, which also may be referred to as the visited service provider. Both of these processes (validation and authentication) are used to prevent fraudulent use of wireless units and for other reasons. General descriptions of these processes and other information about wireless communications systems may be found in the book entitled *Cellular and PCS—The Big Picture* by Lawrence Harte, Steve Prokup and Richard Levine (McGraw-Hill 1997).

Generally, in validation, when a wireless unit initiates a communication in a service area other than its home service area, the visited system serving that visited service area attempts to find the wireless unit's identification (also referred to as registration information) in the visitor location register (VLR) of an appropriate MSC in the visited system (MSC-V). If the visited system does not find the identification, then the wireless unit is determined to be not registered with the visited system. Prior to being provided with communications service in the visited system, a wireless unit typically needs to be registered in the visited system.

To register the wireless unit in the visited system, the MSC-V takes certain steps. Using the wireless unit's identification (which generally may include its mobile number, and electronic serial number (ESN), and/or mobile identification number (MIN), if different from the mobile number), the visited system sends a message to the wireless communications system ("home system") which generally provides wireless communications service to the subscriber. Alternatively, or in addition, the visited system may send a message to a clearing house or other entity other than the home system. The message from the visited system requests validation of the visiting wireless unit. The home system checks a home location register (HLR) in an appropriate MSC (MSC-H) of its system. The clearing house or other entity may check a database, table, or other storage medium of its system. A comparison is made with respect to the identification regarding the wireless unit to determine if the wireless unit is valid. If the wireless unit is valid, then the HLR of the MSC-H and/or the clearing house or other entity responds to the serving MSC in the visited system that the validation was successful. The HLR in the home system and/or clearing house or other entity generally keeps track of the information about the location of the subscriber in a visited system for use in the future routing of calls, etc.

After the serving MSC in the visited system receives confirmation that the visiting wireless unit is valid, the communication initiated by the visiting wireless unit is processed. The VLR of the serving MSC may then temporarily store the visiting wireless unit's information to validate the identity of the wireless unit itself rather than requesting validation again for the next call.

Validation generally is the mechanism for providing information to the subscriber's home system with respect to the subscriber's location in a visited system. With this location information, the home system then may process calls that are received for the roaming subscriber. In particular, when a home system receives a call for its subscriber, the MSC in that home system (MSC-H) checks its HLR to determine if the wireless unit is operating in the geographic area of the home system. The MSC-H may find that the wireless unit is not located in the geographic area of the home system, but rather, is roaming in a visited system. The MSC-H may have location information with respect to the wireless unit. If so, the MSC-H sends a request to the visited MSC (MSC-V) for information that will help the MSC-H in routing the call to the subscriber.

The above processes of validation and call processing are carried out generally with respect to communications that occur within the United States. However, wireless communications between the United States and foreign countries or wireless communications between foreign countries have been problematic. Problems arise because the processes described above may not be carried out with respect to communications between the United States and a foreign country or between foreign countries because of the differences in the wireless systems in the respective countries. A wireless system and its related wireline system in a particular country may not be networked with the wireless system and its related wireline system in a foreign country. Thus, in some cases, information regarding a wireless unit's roaming location in a visited system is not reported properly to the home system. The lack of reporting is especially problematic between countries having differences between their respective wireless systems. Without location information regarding a wireless unit, the home system is unable to route calls to the wireless unit.

In addition, the problems associated with the fraudulent use of wireless units are prevalent in the United States and abroad. Once a wireless unit is registered in a visited system, the wireless unit may be especially vulnerable to being cloned or otherwise fraudulently used.

Accordingly, there is a need for methods and systems that provide location information regarding a wireless unit that is roaming in a visited system to a home system of the wireless unit. Further, there is a need for methods and systems that provides safeguards so as to prevent fraudulent use of wireless units as they roam between and among countries or systems.

SUMMARY

The present invention includes methods, systems, and apparatus that relate to the provision of information to a home wireless communications system regarding a wireless unit that is roaming in a visited wireless communications system. This information may include an identification of the serving mobile switching center (MSC) serving the wireless unit in the visited system. The serving MSC may be identified by its mobile switching center identification (MSCID) information being included as a parameter in a message that is provided to the home system. Advantageously, the receipt of this information by a home system allows the home system to properly route communications to the wireless unit roaming in the visited system, or for other purposes such as delivery of services, repair, record keeping, marketing records, etc.

In addition, the methods, systems, and apparatus of the present invention provide safeguards so as to prevent fraudulent use of wireless units as they roam between and among countries or systems. These anti-fraud features include the limitation that only terminating services be provided as communications services to a wireless unit roaming in a visited system, and/or the limitation that communications services be provided to a wireless unit roaming in a visited system only for an authorization period.

Generally stated, a wireless unit that is roaming in a visited system provides information to a mobile switching center (MSC-V) of the visited system. In response to receipt of the information, the MSC-V routes a message to an international gateway. The international gateway creates a new message or alters the original message, and transmits the new or altered message to a mobile switching center (MSC-H) of the home system. The new or altered message may include an identification of the MSC-V, and in particular, may include an identification of the MSC-V by its MSCID information in a parameter of the new or altered message.

In response to receipt of the new or altered message, the MSC-H may validate the wireless unit (if valid), create a response to the new or altered message, and route the response to the international gateway. The response may include information related to anti-fraud features. For example, the response may include originating and/or terminating service (OCOS/TCOS) information, and in particular, may include an instruction that the wireless unit be provided with only terminating service as the communications service provided in the visited system. As another example, the response may include an authorization period such that the wireless unit is registered and/or is provided with communications service in the visited system only for the authorization period.

In response to receipt of the response, the international gateway may create a new response or alter the response, and transmit the new or altered response to the MSC-V. In response to receipt of the new or altered response, the MSC-V may register the wireless unit, and/or provide the wireless unit with communication services in the visited system, and/or otherwise follows instructions in the new or altered response.

Further, an exemplary embodiment of the present invention advantageously eliminates the need for an exchange of message and response with the home system when the wireless unit moves from a first visited system to a second visited system during an authorization period. For example, the wireless unit may be provided with communications services in a first visited system during an authorization period. The wireless unit may move to a second visited system during the authorization period. The serving MSC in the second visited system checks with the international gateway, which in turn, checks whether the authorization period with respect to the wireless unit has expired. If it has not expired, then the international gateway provides the serving MSC in the second visited system with a validation relating to the wireless unit. The second visited system provides the wireless unit with communications services at least for the remainder of the authorization. It is an advantage that the communications service is continued to the wireless unit in the second visited system without the second visited system having to check with the home system of the wireless unit.

Advantageously, the use of an international gateway in the exchange of messages between the MSC-V of the visited system and the MSC-H of the home system facilitates the exchange of the messages between the appropriate mobile switching centers.

DETAILED DESCRIPTION

Figure 1:
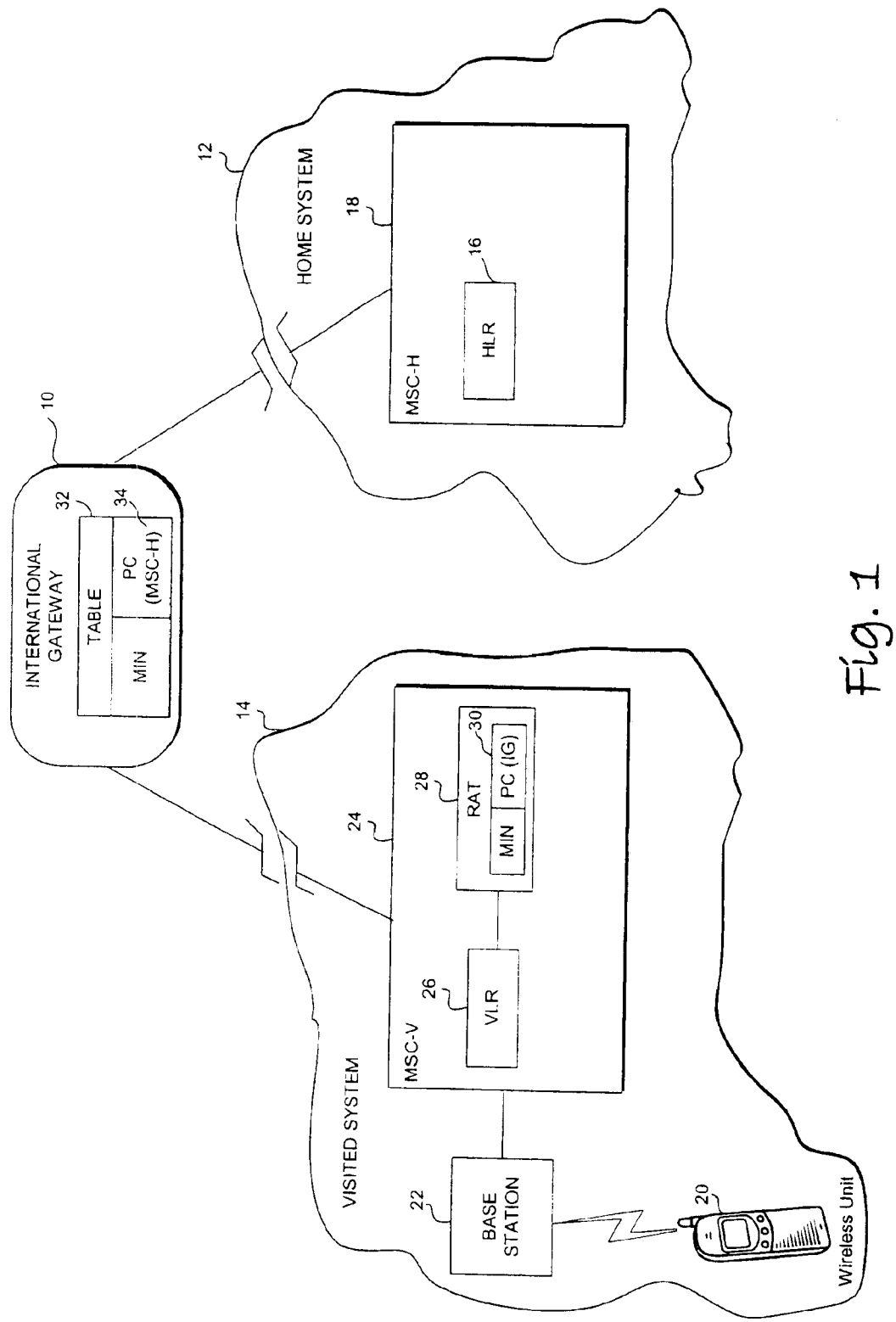
FIG. 1 is a block diagram illustrating use of an exemplary international gateway in an exemplary environment.

The present invention includes methods, systems, and apparatus that relate to the provision of information to a home wireless communications system regarding a wireless unit that is roaming in a visited wireless communications system. Advantageously, the receipt of this information by a home system allows the home system to properly route communications to the wireless unit roaming in the visited system, or for other purposes such as delivery of services, repair, record keeping, marketing records, etc. The methods, systems, and apparatus of the present invention also include anti-fraud features that may be implemented to at least minimize if not eliminate instances of unauthorized or fraudulent use of wireless units.

Generally, the exemplary embodiments of the present invention contemplate uses with wireless units such as cellular telephones and personal communication service (PCS) units that operate under the standards of Advanced Mobile Phone Service (AMPS), Call Division Multiple Access (CDMA), or Time Division Multiple Access (TDMA). Nonetheless, the principles of the present invention may be applied to other communication devices operating under other standards with the appropriate reconfiguration.

Exemplary embodiments of the present invention include an international gateway for use with respect to the referenced wireless communications. Advantageously, the international gateway may be used in a wireless communications system so as to provide a method, system and/or apparatus to provide information regarding a wireless unit that is roaming in the service area of a visited system. The service area of the visited system may be located in the United States or abroad. Further, the international gateway may be used in a wireless communications system so as to provide a method, system and/or apparatus of fraud prevention with respect to the use of wireless units in wireless communications systems.

An exemplary embodiment of the present invention describes the international gateway as a stand-alone unit such as may be embodied by or in a service control point (SCP). The reader is cautioned the international gateway should not be so limited in embodiment. As well as a stand-alone unit, the international gateway may be incorporated in or as part of another device such as an intelligent peripheral (IP) in a wireless communications system, or in other devices. As a result of the functions the international gateway carries out, the international gateway also may be referred to herein as a personal identification (PIN) validation platform. Moreover, the international gateway may be considered to be a series of functions that may be carried out in a single device or that may be carried out through the use of several devices. In the exemplary embodiments described below, generally the international gateway functions in accordance with Signaling System 7 (SS7) protocols as well as EIA/TIA IS-41 protocols, and thus, may be accessed through the connectivity between and among network elements of wireless communications systems and/or wireline communications systems including the public switched telephone network (PSTN). Further, the international gateway may be connected to customer service elements of the service provider of the international gateway, and even may be accessed (or partially) accessed by customers of the service provider of the international gateway through the Internet or other communications networks. Generally, customers of the service provider of the international gateway include carriers who provide wireless service to subscribers and who desire to facilitate the provision of wireless service to such subscribers when they are roaming, and particularly, roaming in foreign countries or systems.

FIG. 1—An Exemplary International Gateway

FIG. 1 is a block diagram illustrating use of an exemplary international gateway 10 in an exemplary environment including a home system 12 and a visited system 14. The home system 12 generally is a wireless communications system provided by a service provider with whom a subscriber has a relationship such that a wireless unit used by the subscriber typically is registered in a home location register (HLR) 16 of a mobile switching center (MSC-H) 18 when the wireless unit is located in the geographic area served by the MSC-H 18. A communication from a caller and directed to the mobile number of the wireless unit is routed to the MSC-H 18 for further routing to the called wireless unit.

FIG. 1 also illustrates a visited system 14 including a wireless unit 20 that is roaming or visiting in the visited system 14. When the wireless unit 20 is turned on, typically it provides registration information to a base station 22 serving the cell of the visiting system wherein the wireless unit 20 is roaming. The registration information typically includes the mobile identification number (MIN) for the wireless unit 20. The base station 22 generally provides the registration information to a mobile switching center (MSC-V) 24.

The actions of the exemplary embodiments in response to the receipt by the MSC-V 24 of the registration information of the wireless unit 20 are further explained with reference to the flow diagram of FIG. 2.

Figure 2:
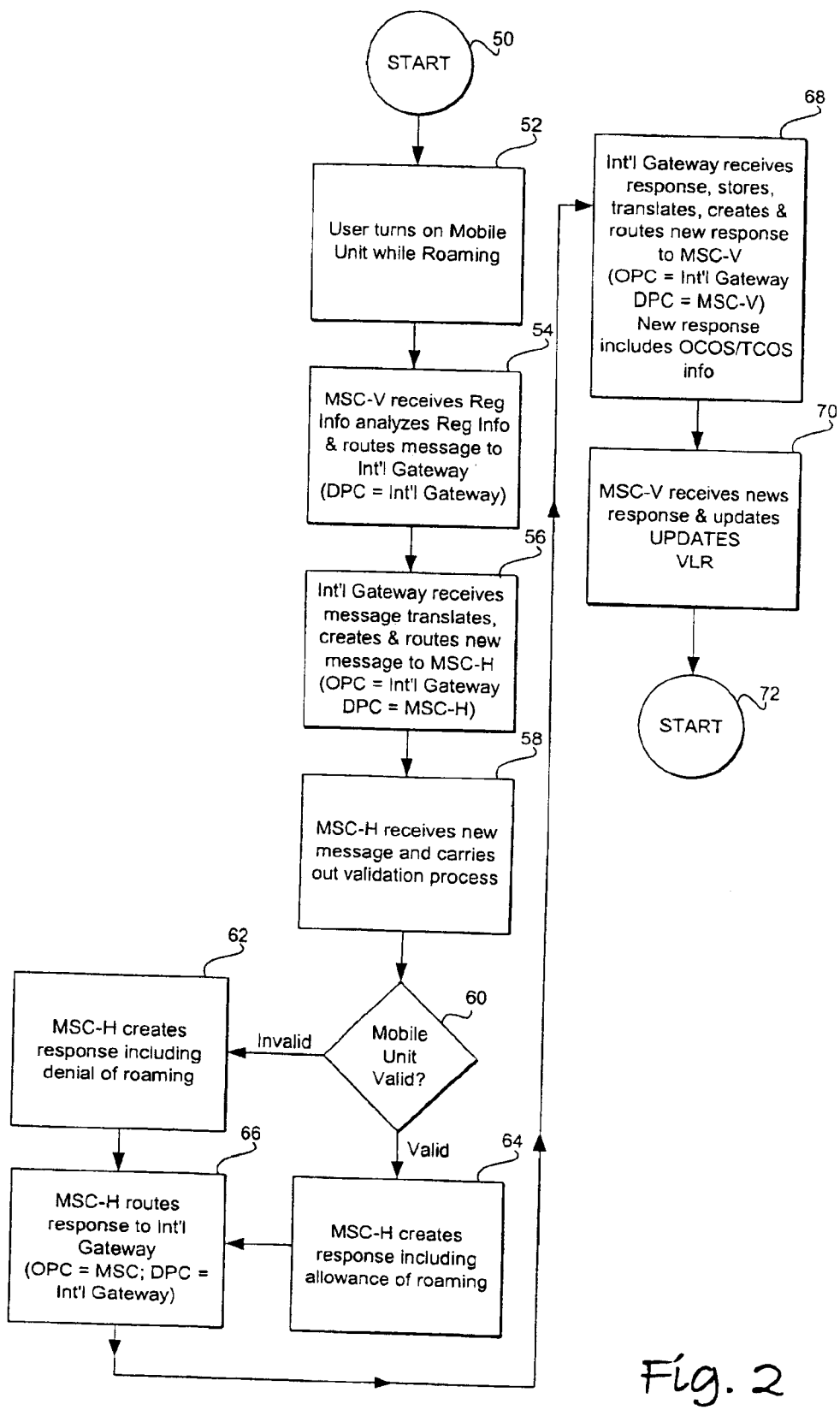
FIG. 2 is a flow diagram illustrating an exemplary method of the present invention.

FIG. 2—An Exemplary Method

FIG. 2 is a flow diagram illustrating an exemplary method of the present invention. Generally, to make and/or receive calls, a wireless unit must be registered, and if the wireless unit is located in a visited system, then the wireless unit must be registered with that visited system. Exemplary embodiments of the present invention provide for the registration of a roamer in a visited system particularly when the visited system is located in a foreign country or uses disparate processes from the home system of the roamer.

Assume a subscriber travels from country A to country B and as a roamer desires to use his or her wireless unit for communications between the two countries. Referring to FIG. 2, after start 50, in block 52, the roamer powers-on or turns on his or her wireless unit 20 and generally begins the registration of the wireless unit 20 with a serving MSC (MSC-V) 24 in a visited system 14 of country B. In block 54, the MSC-V 24 receives the registration information that is provided by the wireless unit 20, which information typically includes the ESN and MIN of the wireless unit 20. In response to receiving the registration information, the MSC-V 24 generally analyzes the information to the extent the MSC-V 24 determines that the wireless unit 20 is a roaming unit and that the wireless unit 20 is not listed in its visitor's location register (VLR) 26. Also, the MSC-V 24 may consult a roamer access table (RAT) 28. In consulting the RAT, the MSC-V 24 may find an entry 30 in the RAT for the MIN of the wireless unit. The entry 30 may provide the MSC-V 24 with an association between the MIN for the wireless unit 20 and a point code for the international gateway 10. The information relating to the association between the wireless unit's information and the point code of the international gateway 10 generally results from a relationship established and based on the roamer's subscription for wireless service from a service provider that is a customer or otherwise affiliated with the international gateway 10 or provider of international gateway services. Thus, the RAT table 28 in the MSC-V 24 may be set up with the point code of the international gateway 10 associated with the visiting subscriber's MIN range in the VLR 26 of the MSC-V 24.

Based on this association between the MIN for the wireless unit 20 and the point code for the international gateway 10, the MSC-V creates a registration message, such as a registration notification (REGNOT) message. The MSC-V 24 uses the point code for the international gateway 10 as a destination point code in the registration message so as to route the message to the international gateway 10. The subsystem number (SSN) of the international gateway 10 also may be included in the message. Typically, the MSC-V 24 sends the message to a routing element such as a service transfer point (STP) in the wireless communications system of country B. The registration message generally contains a mobile identification number (MIN), electronic serial number (ESN), system identification (SID), mobile switching center identification (MSCID), destination point code (DPC), originating point code (OPC), primary interexchange carrier (PIC) code, authorization period, and may include other information.

The following table I provides invoke parameters relating to an exemplary registration message such as a registration notification message:

TABLE I

| | |
|---|---|
| MobileIdentificationNumber | MIN of the wireless unit |
| MobileSerialNumber | ESN of the wireless unit |
| QualificationInformationCode | 3 = Validation and profile |
| SystemMyTypeCode | Vendor of the MSC-V |
| MSCID | 3 octet ID |
| PC_SSN | Octet 1: HLR/VLR |
| | Octet 2–4: International Gateway point code |
| | Octet 3: International Gateway SSN |
| LocationArea | MSCID |

The international gateway typically is not located in either the home system 12 nor the visited system 14. The international gateway 10 is functionally connected to the home system 12 and the visited system 14 so as to receive and transmit messages, and in particular SS7 messages, between the home system 12 and the visited system 14. In particular, the international gateway 10 may be functionally connected to the systems 12, 14 such that messages and responses may be routed from a network element such as a signal transfer point (STP) (preferably over A links) to the international gateway 10. Additional information relating to an exemplary international gateway is provided below in a discussion of FIG. 3.

In response to receiving the registration message, in block 56, the international gateway 10 generally analyzes the information in the message to the extent that the international gateway 10 determines that the information is to be further routed to a home system 12 of the wireless unit 20. In addition, the international gateway 10 may log or store the message or pertinent information from the message so that the international gateway 10 may appropriately respond to the message at a later time. In addition, the international gateway 10 may maintain the last known location (i.e., the visited system) of the wireless unit 10 by recording and storing the relevant parameters of the registration message.

With respect to the analysis of the information in the message, the international gateway 10 may consult a table 32 for information with respect to the further routing of the message. In consulting the table 32, the MSC-V 24 may find an entry 34 in the table 32 for the MIN of the wireless unit 20. The entry 34 may provide the international gateway 10 with an association between the MIN for the wireless unit 20 and a point code for the MSC-H 18 in the home system 12 of the wireless unit 20. Based on this association between the MIN for the wireless unit 20 and the point code for MSC-H 18, the international gateway 10 creates a new registration message. The new message typically is another Registration Notification (REGNOT) message. The new registration message includes the point code for MSC-H 18 as a destination point code so as to route the new message to the MSC-H 18. As an alternative to the use of the table 32, the information for use of the point code for the MSC-H 18 may be obtained in other manners, such as from other tables, from the information in the REGNOT message, or otherwise so that the new message is routed to the MSC-H 18 of the roamer.

The new registration message does not have to be a "new" message such as a freshly created message. Rather, the registration message received from the MSC-V 24 may be translated or altered by the international gateway 10 to create the new registration message. For example, the destination point code in the message may be changed from the point code of the international gateway 10 to the point code of the MSC-H 18. Referring to the invoke parameters listed above in Table I, the international gateway 10 preferably changes the PC_SSN field to correspond to the MSC-H 18. In addition, the originating point code in the registration message may be changed from the point code for the MSC-V 24 to the point code for the international gateway 10 in the new registration message.

Advantageously, the international gateway 10 includes an identification of the MSC-V 24 in the new registration message. Some clearing houses or other entities that pass information between a visited system and a home system fail to include identification of the visited system, and particularly, of the MSC serving the roaming wireless unit in the visited system in messages that are passed to the home system. This failure can be understood from the way messages are typically configured. For example, a clearing house may be sent a registration message from an MSC in a visited system. The originating point code in this registration message is the point code of the MSC in the visited system. When the clearing house forwards the message to the home system, the clearing house substitutes its own point code for the originating point code in the message. In sum, the identification of the MSC in the visited system, and even of the visited system, may be lost by this substitution of point codes.

The failure of including an identification for the visited system, and in particular, for the MSC in the visited system also may stem from the fact that it may be in the clearing house's interests to withhold such identification information from the home system. Without an identification of the MSC in the visited system, or even of the visited system, the home system has no information as to the location of its roaming subscriber. The home system cannot independently take action with respect to its roaming subscriber. The home system must rely on the clearing house to find the location of its roaming subscriber.

Reliance on the clearing house for information regarding the location of a roaming wireless unit may be frustrating to the home system for several reasons. For example, the clearing house may charge the home system for the location information. As another example, the home system may be unable to service its roaming subscriber should problems arise with his/her wireless or with communications service provided to the wireless unit. Without knowing the location of the roaming wireless unit, the home system is hampered in its efforts to correct any service issues. In addition, the home system may be unable to track or otherwise monitor the traffic, use, and/or other such patterns of its subscribers in the use of their wireless units. Such information may be useful to the home system in marketing communication services to subscribers and others.

To overcome the shortcomings with respect to the lack of identification information in the registration information that is passed to the home system, the present invention may include a feature whereby the international gateway 10 includes an identification of the serving switch in the visited system in the registration information that is provided to the home system. In particular, the international gateway 10 includes an identification of the MSC-V 24 in the new registration message. This identification is included in the new registration message as other than a point code for the MSC-V 24. For example, the identification of the MSC-V may be accomplished by including the switch's mobile switching center (MSCID) in an appropriate parameter or even in a parameter designated as MSCID. Advantageously, the home system is provided with the identification of the switch serving the roaming wireless unit in a visited system and the home system may make use of this identification to provide service or to correct service deficiencies to the roaming wireless unit. The home system also may make use of this identification to carry out traffic, use, and/or other pattern studies.

After creation of the new registration message, the international gateway 10 routes the message to the MSC-H 18 of the wireless unit 20.

Referring still to FIG. 2, in block 58, the MSC-H 18 receives the new registration message. In response, the MSC-H 18 checks out the new message with respect to the wireless unit 20, and may store the new message or pertinent information therefrom. Advantageously, the MSC-H 18 may log or store the new message or pertinent information therefrom to retain information about the location of the wireless unit 20 so the MSC-H 18 may use the information to route calls to the roamer 20, to resolve service issues, and/or to carry out traffic, use, or other pattern studies.

In block 60, the MSC-H 18 checks out the new message with respect to the wireless unit 20 by checking whether the wireless unit 20 is valid. If the wireless unit 20 is invalid, then in block 62, the MSC-H 18 creates a response to the new message including a denial of roaming. On the other hand, if the wireless unit 20 is valid, then in block 64, the MSC-H 18 creates a response to the new message including allowance of roaming. Generally, the response includes the point code of the MSC-H 18 as the originating point code and the point code of the international gateway 10 as the destination point code. The response generally is a RegistrationNotificationReturn message.

The following table II provides result parameters relating to an exemplary response:

TABLE II

| | |
|---|---|
| SystemMyTypeCode | Vendor of the MSC-H |
| AuthorizationDenied | If set, the international gateway will log this transaction as a fraud detection by the MSC-H |
| AuthorizationPeriod | 3 = Validation and profile |
| OriginationIndicator | Will be overridden by international gateway |
| Digits | Destination |
| TerminationRestrictionCode | Will be overridden by international gateway |
| CallingFeaturesIndicator | Feature mask |
| Digits | Carrier Id Code |

Advantageously, exemplary embodiments of the present invention provide anti-fraud features. Two of these anti-fraud features are initiated in connection with the response that is created by the MSC-H 18 in response to the new registration message. With respect to one such anti-fraud feature, the MSC-H 18 includes originating and/or terminating service (OCOS/TCOS) information in the response. Generally, OCOS/TCOS information specifies whether the subscriber or the subscriber's carrier allows for originating and/or terminating service in certain situations. Referring to table II, this information includes the OriginationIndicator and the TerminationRestriction Indicator. (OriginationIndicator=2 prevents the wireless unit from originating a call (OCOS) and TerminationRestrictionCode=1 prevents the wireless unit from terminating a call (TCOS)).

Preferably, as an anti-fraud feature, the new response may include an instruction to the MSC-V 24 to deny originating and/or terminating service to the wireless unit 20. The inclusion of this instruction appears to be anti-intuitive in that the purpose of the registration process is to allow the wireless unit 20 eventually to be able to receive originating and/or terminating service. Advantageously, the inclusion of this instruction is an element of the fraud prevention provided by exemplary embodiments of the present invention.

For example, the inclusion of the OCOS/TCOS information may instruct the MSC-V 24 to provide the wireless unit 20 with only terminating service. In other words, the wireless unit 20 may receive communications in the visited system, but may not initiate communications from the visited system. Statistically, most fraudulent uses of a wireless unit 20 are associated with calls made from a unit, i.e., in originating service, rather than in calls made to a unit. Thus, a limitation on communication service to only terminating service to a wireless unit 20 is thought to reduce fraudulent use of the wireless unit 20.

Alternatively, instead of the MSC-H 18 including OCOS/TCOS information or correct OCOS/TCOS information in the response, the international gateway may include the OCOS/TCOS information or override any incorrect OCOS/TCOS information in the response so that the wireless unit will be denied originating service. The international gateway 10 may add to or override the OriginationIndicator and/or the TerminationRestriction Indicator fields so that the wireless unit is will be provided only terminating service.

Another anti-fraud feature that may be initiated in connection with the response that is created by the MSC-H 18 in response to the new registration message relates to an authorization period for communication services to be provided to the wireless unit in the visited system. In particular, the response may include an instruction to the MSC-V 24 with respect to an authorization period. For example, in high fraud areas, a wireless unit 20 may be registered with an MSC-V 24 only for a limited amount of time (i.e., an authorization period), and thus, the wireless unit 20 may receive communications services only for that limited amount of time. This limitation may minimize the possibility the wireless unit 20 may be fraudulently used. In the previous example, the MSC-V 24 receives the authorization period and keeps track of the start and stop of the authorization period with respect to the wireless unit 20. But instead of the MSC-V 24 keeping track, the international gateway 10 may keep track of the authorization period with respect to the wireless unit 20. When the authorization period has expired, the international gateway 10 may send an MSInactive (Invoke Last) message to the MSC-V 24.

Referring again to FIG. 2, after either block 62 or 64, in block 66 the MSC-H 18 routes the response to the international gateway 10 by using the point code of the MSC-H for the originating point code and by using the point code of the international gateway 10 for the destination point code.

In block 68, the international gateway 10 receives the response from the MSC-H 18, creates a new response, and routes the new response to the MSC-V 24. In addition, the international gateway 10 may store the response or pertinent information from the response. The international gateway 10 stores the OCOS/TCOS information that is received in the response because such information may be used later, such as in a QualificationDirective message. Generally, the new response includes the point code of the international gateway 10 as the originating point code and the point code (and possibly the system serial number (SSN)) of the MSC-V 24 as the destination point code. If the response includes OCOS/TCOS information, then the international gateway 10 includes the OCOS/TCOS information in the new response. In addition, if the response includes an instruction with respect to an authorization period, then the international gateway 10 includes the instruction in the new response.

The new response does not have to be a "new" response such as a freshly created response. Rather, the response may be translated or altered by the international gateway 10 to create the new response. For example, the destination point code in the message may be changed from the point code of the international gateway 10 to the point code of the MSC-V 24. In addition, the new response may be changed from the response received from the MSC-H 18 in that the originating point code in the response may be changed from the point code for the MSC-H 18 to the point code for the international gateway 10.

After creation of the new response, the international gateway 10 routes the new response to the MSC-V 24. The international gateway 10 may use the information that the international gateway 10 had stored in connection with the registration message from the MSC-V 24 so as to appropriately respond to the MSC-V 24. Alternatively, the response from the MSC-H 18 may include an identification of the MSC-V 24 such as inclusion of the appropriate MSCID parameter for the MSC-V 24.

Still referring to FIG. 2, in block 70, the MSC-V 24 receives the new response, and if appropriate, updates its VLR 26 by registering the wireless unit 20 in its VLR 26 and/or by providing communications service to the wireless unit 20. The MSC-V 24 also may update its VLR 26 or other databases with respect to the other information related to the wireless unit 20 such as the OCOS/TCOS information and/or the authorization period for the registration of the wireless unit and/or the provision of communication services to the wireless unit 20. The MSC-V 24 does not view this new response as a "new" response, but rather, as a response to its original registration message In response to receiving the new response, the MSC-V 24 may provide the wireless unit 20 with communication services in the visited system 14. Alternatively, in response to receiving the new response, the MSC-V 24 simply may register the wireless unit 20 in its VLR. With respect to the provision of communication services or the registration of the wireless unit 20, the MSC-V 24 also may implement an authorization period if the MSC-V 24 has received such instructions. In other words, the MSC-V 24 may provide the wireless unit 20 with communication service only for a limited time, or may only maintain the registration of the wireless unit 20 in its VLR 26 for a limited time.

If the new response includes OCOS/TCOS information, then the MSC-V 24 may provide the wireless unit 20 with communication services in the visited system 14 based on the OCOS/TCOS information. For example, the OCOS/TCOS information may alert the MSC-V 24 that the wireless unit 20 is only to receive terminating service. In other words, the wireless unit 20 may receive communications, but may not initiate communications. The limitation of communication service to a wireless unit 20 based on OCOS/TCOS information is a fraud control measure and advantage of exemplary embodiments of the present invention. Statistically, most fraudulent uses of a wireless unit 20 are associated with calls made from a unit, i.e., in originating service, rather than in calls made to a unit. Thus, a limitation on communication service to only terminating service to a wireless unit 20 may reduce fraudulent use of the wireless unit 20. The process ends in block 72

Figure 3:
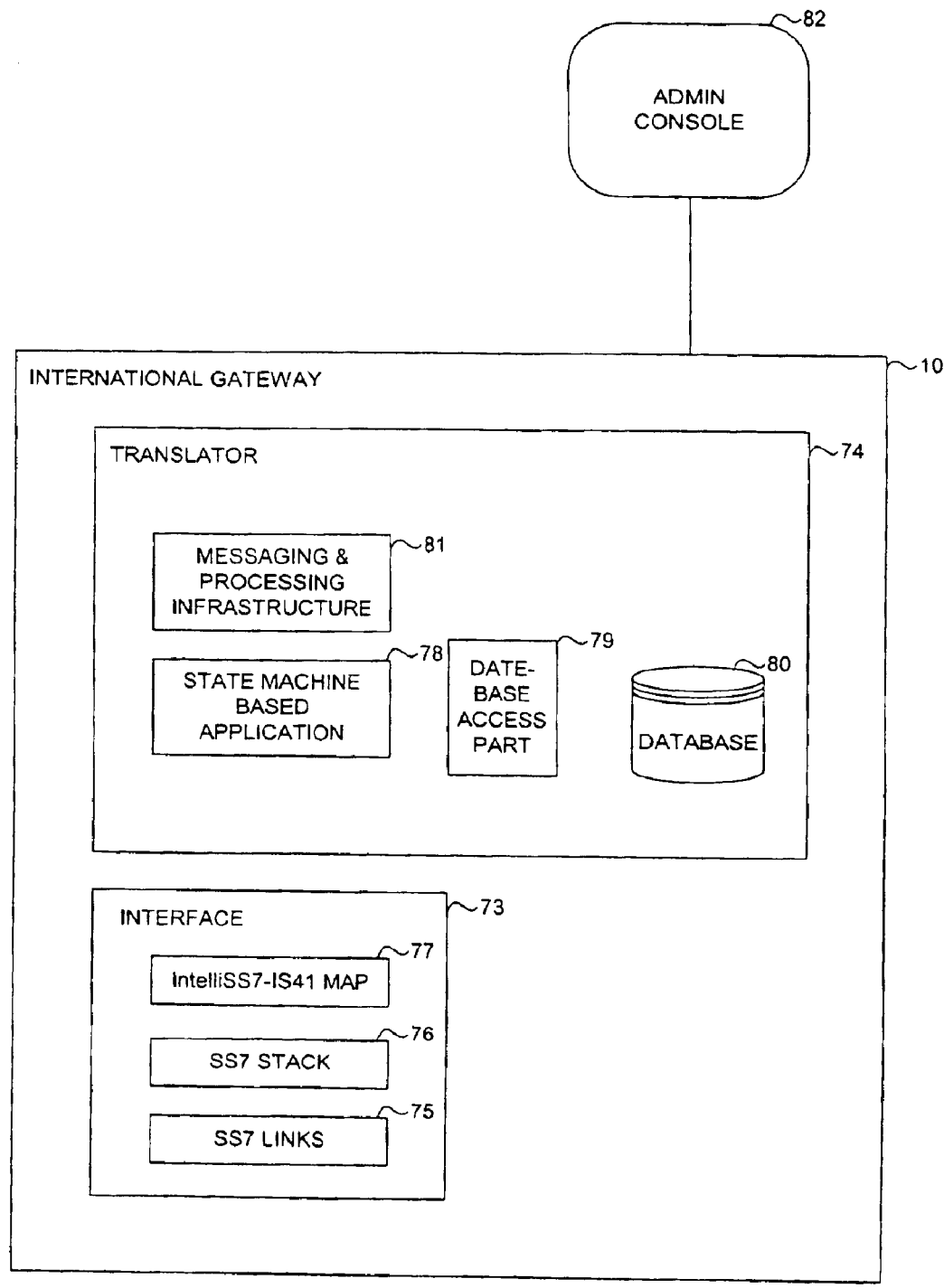
FIG. 3 is a block diagram illustrating an exemplary international gateway.

FIG. 3—An Exemplary International Gateway

FIG. 3 illustrates elements of an exemplary international gateway 10 such as may be used in the exchange of messages and responses between a visited system and a home system. The international gateway 10 generally includes an interface 73 and a translator 74. The interface 73 functions as a connection to the communications systems (and elements thereof) which the international gateway serves. An exemplary international gateway 10 has an interface 73 that includes SS7 links 75 that receive the messages and responses, and that pass the messages and responses to an SS7 stack 76. The SS7 stack 76 discriminates and passes the messages and responses to an IS-41 message handler such as provided by the IntelliSS7-IS41 MAP 77, which is a mapping software. In particular, the SS7 stack 76 passes the data of the IS-41 messages and responses to a I parsing library where the message is decoded according to IS-41 standards. In the parsing library, the message type, components, and parameters are located in the received messages and responses and stored, (or a pointer stored) in structures which can be then accessed directly. Once the messages and responses are parsed, the data then is passed to the translator 74 carrying out the appropriate operations.

An exemplary international gateway 10 has a translator 74 that includes a state machine based application 78, which controls or manages each session. In addition, the translator 74 may include a database access part 79 and a database 80 that may contain the table 32 that is used in determining the routing for a registration message received with respect to a particular wireless unit. More information about the database 80 and the information that may be stored in the database 80 or other memory structure is provided below under the heading "Information With Respect to the International Gateway".

Still referring to FIG. 3, the translator 74 may include a messaging and process infrastructure 81. This infrastructure 81 provides services such as message buffering, message passing, timers, task management, etc.

The international gateway 10 also typically includes at least a connection to an administrative console 82. Information regarding a customer and/or a user may be provisioned in the international gateway 10 through the administrative console 82. A service manager may use the administrative console 82 to monitor transactions or view transactions in the transaction log by transaction number or by MIN/ESN. Other statistical information relating to the operation of the international gateway 10 may be obtained or viewed through the administrative console 82.

Further, the international gateway 10 may include an application interface to a network manager that may be accessed and/or operated through the administrative console 82 or through other elements. For example, the network manager may be an Openview Network Manager available from Hewlett Packard. The application interface may be based on a simple network management protocol (SNMP) to generate traps and alarms to the network manager. Traps may include unknown message or response received and/or PIN modification retries failure.

Generally, the international gateway 10 functions in accordance with Signaling System 7 (SS7) protocols as well as EIA/TIA IS-41 protocols, and thus, may be accessed through the connectivity between and among network elements of wireless communications systems and/or wireline communications systems. Preferably, the international gateway 10 supports the American National Standards Institute (ANSI), International Telecommunications Union (ITU) and ITU International variants of the SS7 protocol up to the transaction capabilities application part (TCAP) layer. In particular, the components of the international gateway 10 communicate among themselves and other data networks via TCP/IP connections. The connectivity preferably supports T1/E1 and V.35 at speeds of up to 64 Kbps. It is further preferred that the international gateway 10 generally does not use the Global Title Translation (GTT) in addressing entities or elements in the systems.

Information with Respect to the International Gateway

The international gateway 10 is set up and continually updated with current information as to users, customers, MSC information, etc. so as to facilitate the exchange of messages and responses between a visited system and a home system of a wireless unit. Generally, the international gateway 10 operates pursuant to IS-41 specifications. For example, the international gateway 10 starts a timer to time the interval between routing a new message and receiving a response to the new message. If appropriate, the international gateway 10 handles a timeout on the response. The international gateway 10 responds with error messages in the appropriate situations. For example, the international gateway 10 responds with a Return Error with an error code of OperationNotSupported if the international gateway 10 receives a message for call delivery to a wireless unit that has not registered, that is outside its authorization period, etc. Error codes may include SystemFailure, ParameterError, UnrecognizedParameterValue; MIN/HLRMismatch, UnrecognizedESN, Operation Sequence Problem, and/or ResourceShortage.

The international gateway 10 may include the table 32 and/or database 80 as well as other memory or storage facilities with respect to the information that is necessary or available with respect to operation of the international gateway 10.

User or Subscriber Information

The table 32 or database 80 may include entries or records related to users. Each entry or record may include the following information or a field (which may be empty until filled) for the following information with respect to the user or the wireless unit of the user: a mobile identification number (MIN); an electronic serial number (ESN); a user or subscriber name; a personal identification number (PIN); a date-time of last PIN change; a number of retries for PIN change in current interval; an MSC-H; a current MSC-V; a previous MSC-V; a date-time of last successful PIN validation; a number of retries for PIN validation in current interval; a date-time of last Registration Notification; OCOS information returned by the MSC-H; TCOS information returned by the MSC-H; a temporary local dialing number (TLDN); user or subscriber status; calling features mask; carrier digits; billing identification; destination digits; and/or a date-time of first unsuccessful validation attempts in current interval.

The user or subscriber information may be provisioned in the international gateway 10 through the administrative console 82 or in batch mode through bulk updates transferred from customers.

System Information

The international gateway 10 may store system information with respect to the international gateway 10 in the database 80 or in another storage structure. For example, the following system configuration information may be stored: a system type code; a point code; a subsystem number (SSN); and/or a carrier identification code. Also, the system configuration information may include information relating to the use of PINs such as the maximum number of retries and the retry interval Further, the international gateway may store a point code and a SSN for each of the mobile switching centers (MSCs) or other switches which may serve as either origination or destination points with respect to messages and responses that may be sent to and from the international gateway 10.

Transaction, Tracing and Audit Information

The international gateway 10 generally carries out transaction and tracing functions with respect to the messages and responses that may be sent to and from the international gateway 10. A message and its corresponding response generally is referred to as a transaction, and the message and its corresponding response typically includes a transaction number or other identification of the transaction. The international gateway 10 logs the transaction number into a transaction log (not illustrated), which also may be referred to as log files or into the database 80. Preferably, the log of the transaction includes a timestamp for the transaction. The international gateway 10 may include a tracing mechanism (not illustrated in FIG. 3) and may include four levels of trace messages with each level providing a different amount of detailed information. Also, the international gateway 10 may include audit trails for all changes made to the database, such as changing a PIN, etc. These audit trails may be recorded and stored.

MSC Information

To facilitate the exchange of messages and responses, the international gateway 10 may store information such as attributes with respect to mobile switching centers (MSCs) which are involved in transactions related to a wireless unit. These attributes may include: an MSC identification; a location; a point code; a subsystem number (SSN); an HLR identification (null if co-located with the MSC); an HLR point code; an HLR SSN; a VLR identification (null if co-located with the MSC); a VLR point code; a VLR subsystem number (SSN); an authentication center (AC) identification; an AC point code; and/or an AC SSN. This information may be stored in the database 80 or in some other memory structure. An exemplary embodiment of the international gateway 80 stores this information in a functional entity messaging relationship table (FEMR table).

Home-Visited Relationship

The international gateway 10 may include a table or other structure that sets forth a relationship including operating or override values between mobile switching centers (MSCs) in a home visited relationship. This table may be used by the international gateway 10 to override values that are present in the user or subscriber entry or record when appropriate. For example, the visited MSC may be located in a high fraud area. In that case, an authorization period with respect to the registration or provision of communications service to a wireless unit may be instituted through the provision of instructions from the MSC-H or the international gateway to the MSC-V or otherwise. Thus, this table may include the following attributes, information or fields: MSC-H identification; MSC-V identification; authorization period; and/or authorization value.

MSC-NPA Information

The international gateway 10 may have to determine the MSC-H of a particular wireless unit based on the information that is provided to the international gateway 10 by the MSC-V. Typically, the international gateway 10 uses the MIN of the wireless unit to find the MSC-H (and its point code) by using an MSC-NPA information table. Particularly, the MIN may be compared to the entries of NPA-NXX-x blocks that are stored in the table to determine the NPA-NXX-x block corresponding to the MIN, and then to determine the MSC-H (and its point code) serving the NPA-NXX-x block corresponding to the MIN. Thus, an entry in the MSC-NPA information table may include the following fields, attributes or information: MSC-H identification; and NPA-NXX-x block (being served by the MSC-H of the entry).

Figure 4:
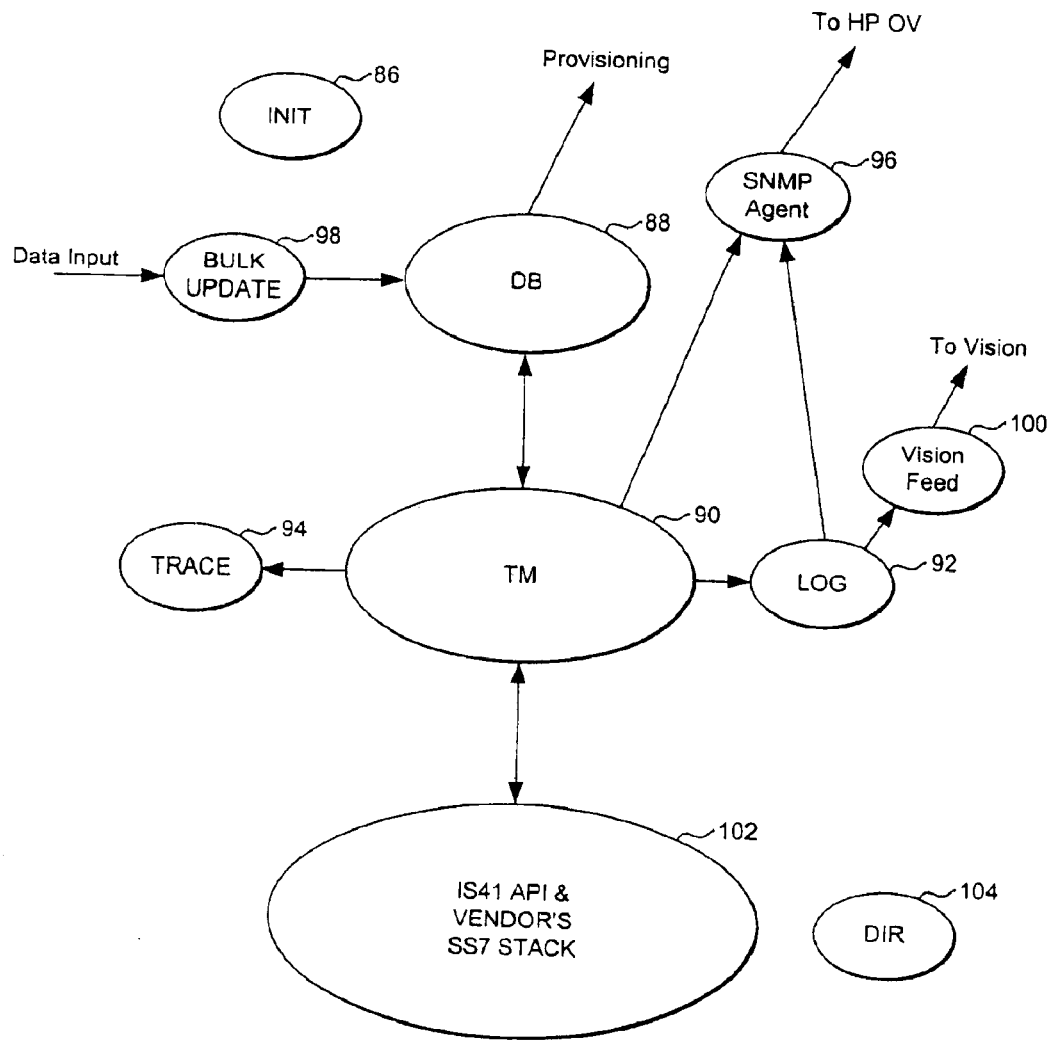
FIG. 4 is a diagram of logical software entities in an exemplary international gateway.

FIG. 4—Logical Software Entities of an Exemplary International Gateway

To facilitate the understanding of the operation of an exemplary international gateway 10, FIG. 4 presents a diagram of logical software entities or modules of such a gateway. The modules are presented in the diagram from a logical standpoint. They do not represent separate processes that run the international gateway 10, but rather, each module presents a functionality that may be used in the gateway.

The modules include INIT 86 which is an initialization function that brings up and monitors the application processes on the international gateway 10. DB 88 is a database interface in the form of a functional application program interface (API) for interaction with a user. DB 88 also includes the database server part that is provided by the vendor of the database. TM 90 is a transaction manager which registers with the SS7 processes to gain access to the SS7 stack. The transaction manager 90 receives and sends IS-41 messages and responses through the SS7 processes. The transaction manager 90 links with the DB 88 in order to use the database server.

Log 92 is a library that provides a functional API to record every IS-41 message and response that is sent and received. This API is used to record all of the IS-41 messages and responses that pass through the international gateway 10. Trace 94 is a library that provides debugging aids for integration and testing. SNMP Agent 96 is a process that forwards simple network management protocol (SNMP) traps to the network manager such as the Openview Network Manager from Hewlett Packard. This SNMP Agent 96 also provides a message queue for the other application software entities to send event/alarm information, which is converted to a trap and forwarded as appropriate.

Bulk Update 98 is a script that updates the database with large numbers of records or entries, generally with respect to users. Vision Feed 100 is a process that provides a continuous feed of all IS-41 messages and responses being sent and received by the international gateway 10 to a separate entity for further processing (billing, debugging, network problems, etc.). IS-41 API & Vendor's SS7 102 stack is an IS-41 API built on top of the SS7 stack. The SS7 stack functionality is handled within separate processes, i.e., they are not libraries. The IS-41 API is incorporated in these separate processes. DIR 104 is a platform configuration task called the Director. It provides a command line interface for configuring the SS7 stack and all network parameters associated with setting up the international gateway 10 as a functional network entity. The DIR 104 also can be used to control the SS7 stack processes.

Figure 5:
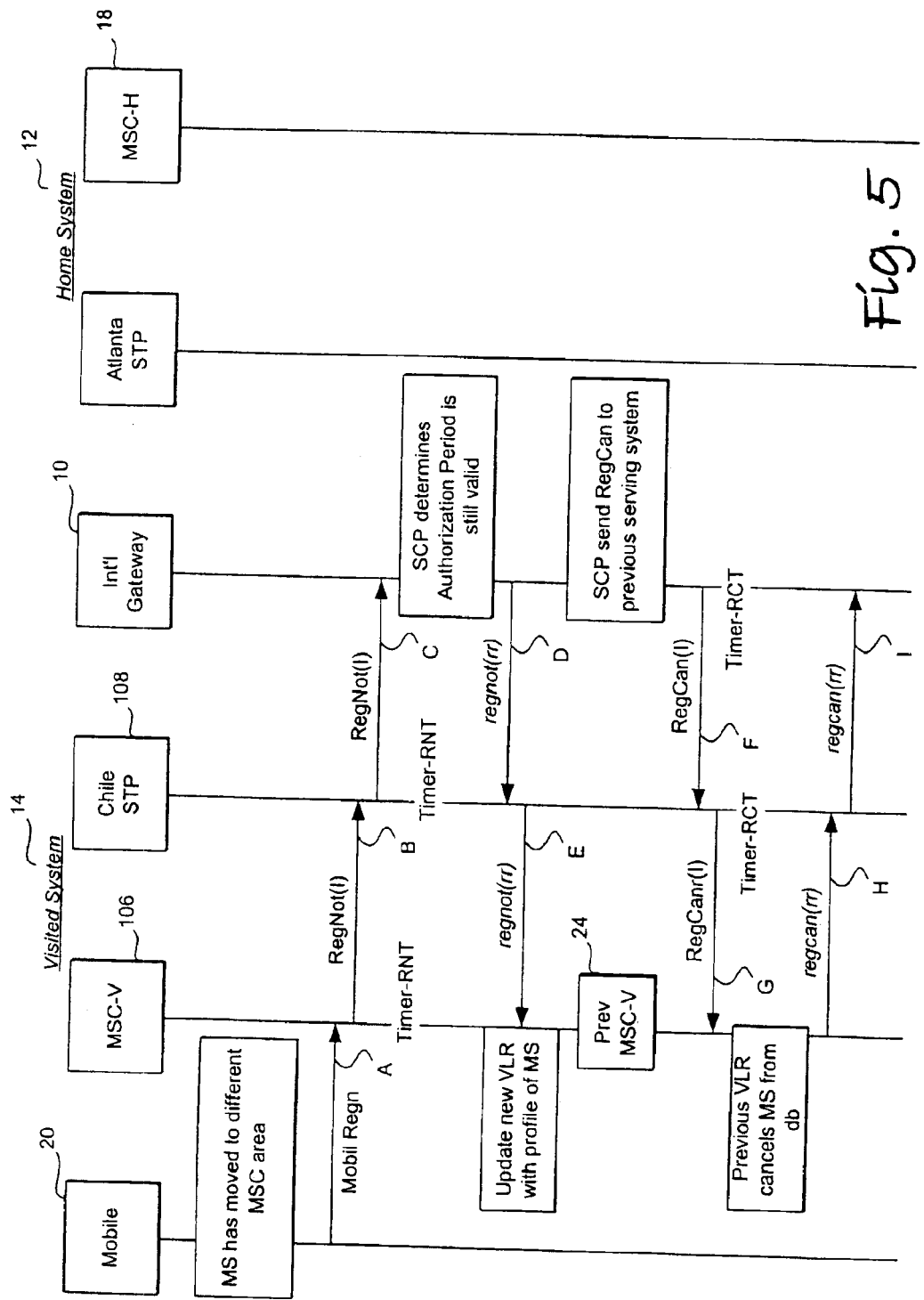
FIG. 5 is a diagram of the message/response exchange handled by an exemplary international gateway with respect to the second registration of a wireless unit within an authorization period.

FIG. 5—A Second Registration within an Authorization Period

A wireless unit 20 may be registered with a visited system 14 pursuant to the exemplary method illustrated in FIG. 2. Pursuant to that exemplary method, the wireless unit 20 may be assigned an authorization period with respect to its registration in the visited system 14 or with respect to communication services to be provided to the wireless unit in the visited system 14. Given the mobility of users, the wireless unit 20 may be moved from the area served by the MSC-V 24 in the visited system 14 to a different area served by another MSC ("new MSC-V" or "second MSC-V") in the visited system 14 or in another visited system ("second visited system"). The move may occur within the authorization period initially assigned to the wireless unit 20. Advantageously, the present invention includes embodiments whereby the international gateway 10 provides the new MSC-V with a response that indicates the wireless unit 20 is valid with respect to registration or the provision of services. The international gateway 10 facilitates this validation by handling the response to the new MSC-V rather than exchanging a message and response with the MSC-H 18 of the home system 12.

FIG. 5 is a diagram of the message and response exchange between the international gateway 10 and the new MSC-V 106 in the visited system 14 with respect to the second registration of the wireless unit 20 within an authorization period. The wireless unit 20 (also referred to as "mobile") has moved to a different MSC area (i.e., the area served by the new MSC-V (106).

As illustrated by arrow A, the wireless unit 20 transmits information such as registration information (Mobil Regn) to the new MSC-V 106. In response to receiving the registration information, the new MSC-V 106 generally analyzes the information to the extent the new MSC-V 106 determines that the wireless unit 20 is a roaming unit and that the wireless unit 20 is not listed in its visitor's location register (VLR). Also, the new MSC-V 106 may consult a roamer access table (RAT). In consulting the RAT, the new MSC-V 106 may find an entry in the RAT for the MIN of the wireless unit. The entry 30 may provide the new MSC-V 106 with an association between the MIN for the wireless unit 20 and a point code for the international gateway 10. The association between the wireless unit's information and the point code of the international gateway 10 generally results from the relationship established and based on the roamer's subscription for wireless service from a service provider that is a customer or otherwise affiliated with the international gateway 10 or provider of international gateway services. Thus, the RAT table in the new MSC-V 106 may be set up with the point code of the international gateway 10 associated with the visiting subscriber's MIN range in the VLR.

Based on this association between the MIN for the wireless unit 20 and the point code for the international gateway 10, the new MSC-V 106 creates a registration notification (REGNOT) message. The new MSC-V 106 uses the point code for the international gateway 10 as a destination point code in the registration notification message so as to route the message to the international gateway 10. The subsystem number (SSN) of the international gateway 10 also may be included in the message. Typically, as indicated by arrow B, the new MSC-V 106 sends the REGNOT message to a routing element such as a service transfer point (Chile STP as illustrated) 108 in the visited system 14. As indicated by arrow C, the Chile STP 108 routes the REG-NOT message to the international gateway 10.

In response to receiving the registration notification message, the international gateway 10 generally analyzes the information in the message. In particular, the international gateway 10 may consult its table 32, database 80, or other storage unit by using the MIN of the wireless unit. In this consultation, the international gateway may determine that the wireless unit 20 has registered with the MSC-V 24 and that the wireless unit's attempt at registration with the new MSC-V 106 is a second registration within an authorization period. In addition, the international gateway 10 may log or store the message or pertinent information from the message.

Based on the determination that this is a second registration within an authorization period, the international gateway 10 creates a response to the registration notification message. The response generally is a RegistrationNotificationReturn (regnot) message.

As indicated by arrow D, the international gateway 10 routes the response by way of the appropriate STP (such as illustrated Chile STP 108), which in turn, as indicated by arrow E, routes the response to the new MSC-V 106. The response may include OCOS/TCOS information or instructions with respect to an authorization period. The new MSC-V 106 receives the response, and if appropriate, updates its VLR by registering the wireless unit 20 in its VLR. The new MSC-V 106 also may update its VLR or other databases with respect to the other information related to the wireless unit 20 such as the OCOS/TCOS information or the authorization period. In response to receiving the response, the new MSC-V 106 may provide the wireless unit 20 with communication services in the visited system 14. Alternatively, in response to receiving the response, the new MSC-V 106 simply may register the wireless unit 20 in its VLR. With respect to the provision of communication services or the registration of the wireless unit 20, the new MSC-V also may implement an authorization period if the new MSC-V 106 has received such instructions. In other words, the new MSC-V 106 may provide the wireless unit 20 with communication service only for a limited time, or may only maintain the registration of the wireless unit 20 in its VLR for a limited time. Yet another alternative is that the new MSC-V 106 may receive OCOS/TCOS information in the response from the international gateway 10. If so, then the new MSC-V 106 may provide the wireless unit 20 with communications services based on the OCOS/TCOS information. For example, assume the response includes OCOS/TCOS information such that the new MSC-V 106 is to provide the wireless unit with terminating service only as the communication services to be provided to the wireless unit. In that case, the new MSC-V follows through and provides the wireless unit only with terminating service. If an authorization period also is included in the response, then the new MSC-V may provide the wireless unit with terminating service only and only for the authorization period.

Still referring to FIG. 5, also as a result of receiving a second registration message with respect to the wireless unit 20 within an authorization period, the international gateway 10 may take action to inform the MSC-V 24 that the wireless unit 20 has left the area served by the MSC-V 24. In particular, as illustrated in arrow F, the international gateway 10 sends a registration cancellation (RegCan) message by way of the appropriate STP (such as the illustrated Chile STP 108), which in turn, as indicated by arrow G, routes the registration cancellation message to the MSC-V 24. In response to receiving the registration cancellation message, the MSC-V 24 cancels the registration of the wireless unit 20 from its VLR 26 or as otherwise appropriate. In addition, as indicated by arrow H, the MSC-V 24 generally sends a response (regcan) to the registration cancellation message by way of the appropriate STP (such as the illustrated Chile STP 108), which in turn, as indicated by arrow I, routes the response to the international gateway 10.

Advantageously, the international gateway 10 facilitates the second registration of the wireless unit 20 within the authorization period by eliminating any need for a transaction with the MSC-H of the home system 12. Also, the international gateway 10 facilitates record keeping in the previously visited MSC-V by providing it with instructions to cancel the registration of the wireless unit 20.

CONCLUSION

In sum, the exemplary embodiments of the present invention include methods, systems, and apparatus for providing information to a home system regarding a wireless unit roaming in a visited system. This information is provided with a message that is transmitted from the visited system where the wireless unit is roaming to an international gateway, which in turn, transmits the information to the home system of the wireless unit. The information may include an identification of the mobile switching center (MSC) serving the wireless unit in the visited system. Advantageously, the information may be used by the home system to route communications to the wireless unit in the visited system, or for other purposes such as delivery of services, repair, record keeping, marketing records, etc. The exemplary embodiments also may include anti-fraud features such as the limitation of communications service to the wireless unit in the visited system to terminating service only and such as the limitation of an authorization period for the provision of communications service to the wireless unit in the visited system.

From the foregoing description of the exemplary embodiments and the several alternatives, other alternative constructions of the present invention may suggest themselves to those skilled in the art. Therefore, the scope of the present invention is to be limited only to the claims below and the equivalents thereof.

We claim:

1. A method to allow a wireless unit that is roaming in a visited system to receive communication services in the visited system based on registration information the wireless unit provides to a visited mobile switching center (MSC-V) in the visited system, the method comprising:
   A. in response to receiving the registration information, causing the MSC-V to route a registration message to an international gateway;
   B. in response to receiving the registration message, causing the international gateway
      i. to create a new registration message, the new registration message including an identification of the MSC-V; and
      ii. to route the new registration message to a home mobile switching center (MSC-H) of the wireless unit;
   C. in response to receiving the new registration message, causing the MSC-H
      i. to validate the wireless unit,
      ii. to create a response, and
      iii. to route the response to the international gateway;
   D. in response to receiving the response, causing the international gateway
      i. to create a new response, and
      ii. to route the new response to the MSC-V; and
   E. in response to receiving the new response, causing the MSC-V to provide the wireless unit with the communication services in the visited system.

2. The method of claim 1, wherein the identification of the MSC-V comprises a mobile switching center identification (MSCID) parameter.

3. The method of claim 1, wherein the response comprises originating and/or terminating service (OCOS/TCOS) information;

wherein the new response comprises the OCOS/TCOS information; and
   wherein the MSC-V is caused to provide the wireless unit with the communication services in the visited system based on the OCOS/TCOS information.

4. The method of claim 3, wherein the OCOS/TCOS information comprises an instruction to provide terminating services only; and
   wherein the MSC-V is caused to provide the wireless unit with the terminating services only as the communication services in the visited system based on the OCOS/TCOS information.

5. The method of claim 1, wherein the MSC-V is caused to provide the wireless unit with the communication services in the visited system for an authorization period.

6. The method of claim 5, wherein the MSC-V comprises a first MSC-V, and wherein the wireless unit moves to an area served by a second MSC-V, further comprising:
   F. receiving at the second MSC-V second registration information from the wireless unit;
   G. in response to receiving the second registration information, causing the second MSC-V to reroute a second registration to the international gateway;
   H. in response to receiving the second registration, causing the international gateway to make a determination that the authorization period is in effect; and
   I. in response to the determination, causing the international gateway to send a validation with respect to the wireless unit to the second MSC-V.

7. The method of claim 6 further comprising:
   J. in response to receiving the validation, causing the second MSC-V to provide the wireless unit with the communication services in the area served by the second MSC-V.

8. An international gateway for use in obtaining communication services for a wireless unit that is roaming in a visited system, the international gateway comprising:
   A. an interface operative to receive a registration message with respect to the wireless unit from the visited system;
   B. a translator functionally connected to the interface and operative
      i. to determine a home system for the wireless unit based on the registration message,
      ii. to substitute a point code for an element of the home system as a destination point code in the registration message, and
      iii. to cause the registration message to be routed to the home system;
   C. the interface also operative to receive from the home system a response to the registration message, the response including validation information and originating and/or terminating service (OCOS/TCOS) information with respect to the wireless unit; and
   D. the translator also operative
      i. to substitute a point code for an element of the visited system as a destination point code in the response, and
      ii. to cause the response to be routed to the element of the visited system,
   whereby the communication services for the wireless unit are obtained based on the validation information and on the OCOS/TCOS information regarding the wireless unit through an exchange of messages and responses among the visited system, the international gateway, and the home system.

9. The international gateway of claim 8, wherein the registration message comprises a mobile switching center identification (MSCID) parameter.

10. The international gateway of claim 8, wherein the OCOS/TCOS information comprises an instruction to provide terminating services only.

11. The international gateway of claim 8, wherein the visited system comprises a first visited system;

wherein the wireless unit moves to an area served by a second visited system; and wherein the interface is also operative to receive a second registration message from the second visited system;

wherein the translator comprises storage, and the translator is operative to use the registration message to check the storage to make a determination that an authorization period assigned to the wireless unit for provision of the communication services to the wireless unit is in effect; and wherein the translator also is operative to send a validation of the wireless unit to the second visited system.

12. A system to provide a home system with information about a wireless unit that is roaming in a visited system based on registration information the wireless unit provides to the visited system, the system comprising:

A. a mobile switching center of the visited system (MSC-V) operative to receive the registration information and in response to route a registration message to an international gateway;

B. the international gateway operative to receive the registration message, and in response, to create a new registration message including an identification of the MSC-V, the identification being other than a point code for the MSC-V, and to route the new registration message to a home mobile switching center (MSC-H) in the home system of the wireless unit; and C. the MSC-H operative to receive the new registration message, whereby the home system is provided with the information about the wireless unit including the identification of the MSC-V serving the wireless unit.

13. The system of claim 12, wherein the MSC-H is further operative in response to receiving the new registration message to validate the wireless unit, to create a response including originating and/or terminating service (OCOS/TCOS) information, and to route the response to the international gateway;

wherein the international gateway is further operative to receive the response, to create a new response based on the response, the new response including the OCOS/TCOS information, and to route the new response to the MSC-V; and the MSC-V being further operative to receive the new response, and to provide the wireless unit with the communication services in the visited system based on the OCOS/TCOS information.

14. The system of claim 12 wherein the identification of the MSC-V comprises a mobile switching center identification (MSCID) parameter.

15. The system of claim 13 wherein the OCOS/TCOS information comprises an instruction to provide terminating service only; and wherein the MSC-V is caused to provide the wireless unit with the terminating service only as the communication services in the visited system based on the OCOS/TCOS information.

16. The system of claim 13, wherein the MSC-V is further operative to provide the wireless unit with the communication services in the visited system based on the OCOS/TCOS information for an authorization period.

17. The system of claim 13, wherein the MSC-V comprises a first MSC-V;

wherein the wireless unit moves to an area served by a second MSC-V;

wherein the international gateway is operative to receive second registration information from the second MSC-V, to make a determination that an authorization period assigned to the wireless unit for provision of the communication services to the wireless unit is in effect, and to send a validation to the second MSC-V; and wherein the second MSC-V in response to receipt of the validation provides the wireless unit with the communication services in the area served by the second MSC-V.

18. In a communications environment wherein a wireless unit has a registration with a first visited mobile switching center (MSC), and wherein the wireless unit moves to an area served by a second visited MSC, a method for validating the wireless unit with the second visited MSC without checking with a home system of the wireless unit, comprising:

A. receiving at the second visited MSC registration information from the wireless unit;

B. in response to receiving the registration information causing the second visited MSC to route the registration information to an international gateway;

C. in response to receiving the registration information, causing the international gateway to make a determination that an authorization period assigned to the wireless unit for provision of communication services is in effect; and D. in response to the determination, causing the international gateway to send a validation with respect to the wireless unit to the second visited MSC.

19. The method of claim 18 further comprising:

E. upon receiving the validation, causing the second visited MSC to consider the wireless unit as validated.

20. The method of claim 18 further comprising:

E. also in response to the determination, causing the international gateway to send a registration cancellation message to the first visited MSC; and F. in response to receiving the cancellation message, causing the first visited MSC to cancel the registration of the wireless unit in the first visited MSC.

21. The method of claim 18, further comprising:

upon receiving the validation, causing the second visited MSC to provide the wireless unit with the communication services.

22. The method of claim 21 wherein the communication services comprise terminating services only.

23. The method of claim 21 wherein the second visited MSC is caused to provide the wireless unit with the communication services for an authorization period.

* * * * *